June 3, 1930.　　O. E. HUNT ET AL　　1,761,920

TRUCK TIRE CARRIER

Filed Dec. 15, 1927　　2 Sheets-Sheet 1

Inventors
Osmond E. Hunt &
Albert G. Geistert
By
Blackmore, Spencer & Fluch
Attorneys June 3, 1930.  O. E. HUNT ET AL  1,761,920

TRUCK TIRE CARRIER

Filed Dec. 15, 1927   2 Sheets-Sheet 2

Inventors
Ormond E. Hunt &
Albert G. Geistert
By
Blackmore, Spencer & Hiuh
Attorney Patented June 3, 1930

1,761,920

UNITED STATES PATENT OFFICE

ORMOND E. HUNT AND ALBERT G. GEISTERT, OF DETROIT, MICHIGAN, ASSIGNORS TO GENERAL MOTORS CORPORATION, OF DETROIT, MICHIGAN, A CORPORATION OF DELAWARE

TRUCK-TIRE CARRIER

Application filed December 15, 1927. Serial No. 240,178.

This invention relates to a spare rim and tire carrier for an automotive vehicle and has to do particularly with an underslung carrier for a spare tire and rim for use with trucks and passenger cars.

It is an object of this invention to provide a new and improved rim and tire carrier which is simpler in construction and which can be more easily and cheaply manufactured than those now in use. More specifically it is an object of the invention to construct the rear end of the chassis with a rim and tire carrier for carrying a rim and tire under the body of the vehicle so that it may be rigidly and securely mounted and yet can be easily and quickly removed and replaced.

One of the particular advantages of our improved construction is that it will hold a spare rim carrying an inflated tire or a spare rim without a tire equally well. We have illustrated our invention as applied to both a passenger car and a truck and desire it to be understood that it is not limited in its utility to either.

Other objects and advantages of the invention will appear in the course of the following description, taken in connection with the accompanying drawing and appended claims.

Figure 1:
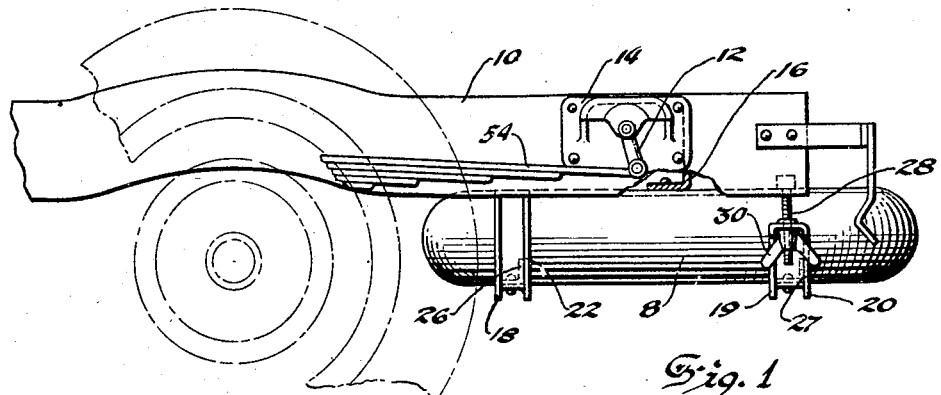
Figure 1 is a side elevation of the rear end of the chassis of a truck embodying our invention.
Figure 2:
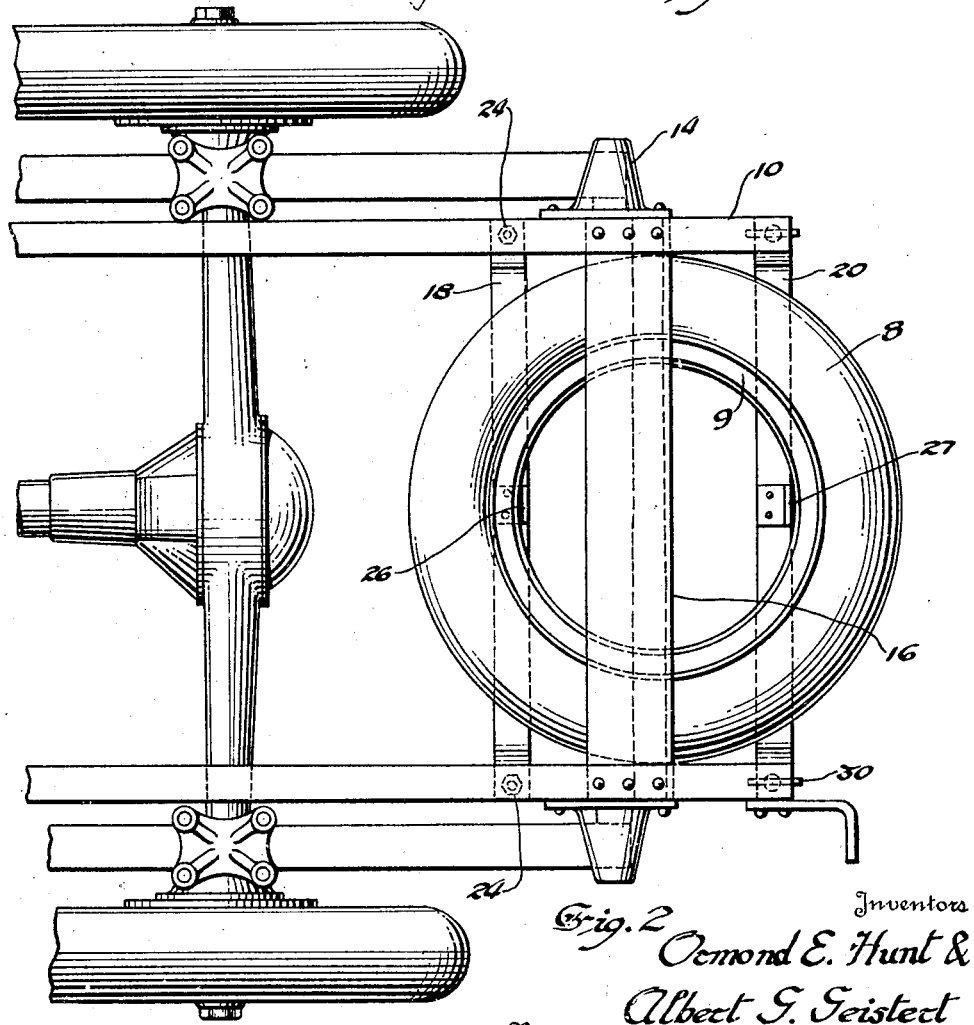
Figure 2 is a plan view of the same.

Referring to Figure 1, we have illustrated the rear end of the chassis of a conventional truck comprising the usual channel shaped side frame members 10 to which the springs are attached by means of the usual spring shackles 12 and fastening plates 14. Connecting the two frame members 10 at a point adjacent the spring shackles is the channel shaped cross member 16 having upper and lower horizontal portions and a central portion all three being riveted to the respective horizontal and vertical portions of the frame members 10. Suspended from the frame members 10 in front of and in rear of the cross member 16 are the U-shaped supports 18 and 20 which are of a shallow channel shape in cross section for providing a maximum of strength. The side portions 22 of the front support 18 are bent outward and are apertured for the reception of bolts 24 by means of which the support is fixed to the frame members 10. Fixed to and extending upward from the center of the bight or horizontal portion of the support 18 is a lug 26.

The rear support 20 is identical with the front support 18 except that the side portions 19 are shorter and is supported from the frame members 10 by means of bolts 28 which are provided with wing nuts 30.

A rim 9 and inflated tire 8 are illustrated in position in the tire carrier. In this position, the lugs 26 and 27 abut against the inner side of the rim at diametrically opposed points. The rim and tire are held against upward movement by the cross member 16, the front and rear portions resting on the front and rear supports 18 and 20 respectively, the latter of which can be adjusted vertically by tightening the wing nuts 30 to hold the rim and tire tightly. Movement of the rim and tire in a horizontal plane is prevented by the central lugs 26 and 27 mounted on the supports 18 and 20 respectively and by the fact that the upper side of the tire, or of the rim alone in case no tire is carried, is clamped tightly against the under side of cross member 16. Upon removal of one wing nut 30 and movement of rear support 20 to one side, the rear part of the rim and tire can be swung down and the front part lifted to clear the lug 26 to permit removal. Replacement of the rim and tire on the support is accomplished in a similar manner.

Figure 3:
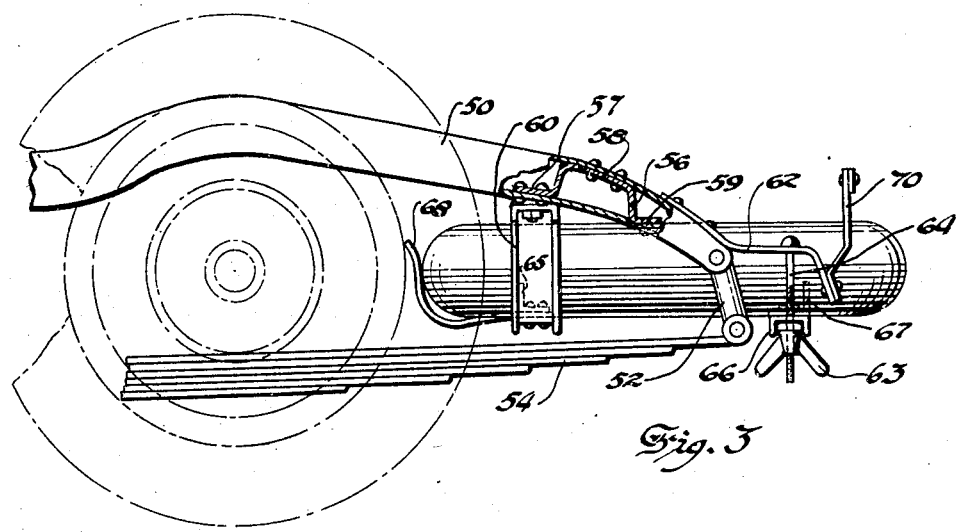
Figure 3 is a side elevation partly broken away of the rear end of the chassis of a passenger car embodying our invention.
Figure 4:
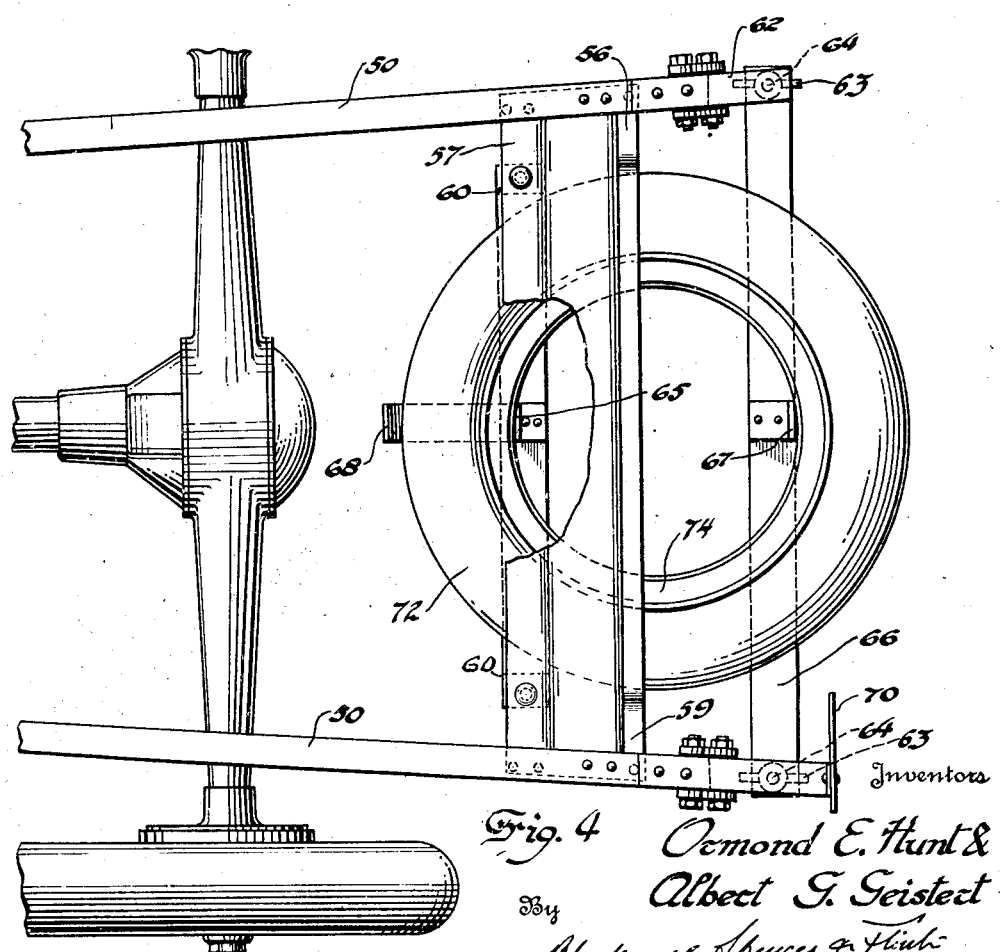
Figure 4 is a plan view of the structure shown in Figure 3.

In Figures 3 and 4, we have illustrated our invention as applied to a chassis which may be that of a passenger car or of a light delivery truck. Connected with the rear ends of the channel shaped side frame members 50 are the usual spring shackles 52 to which the leaf springs 54 are attached. A short distance in front of the spring shackles is a channel-shaped cross member 56 which in cross-section is substantially the shape of an inverted U. At each end of the cross member 56 the upper central portion 58 is riveted to the upper flange of the frame member 50, while the front and rear flanges 57 and 59 respectively are riveted to the lower flange of the respective frame member 50. The main portion of the rear flange 59 is bent to assume a horizontal position for contacting with the upper side of the spare tire or rim which will be held in a horizontal position, as described in detail below.

Rigidly suspended from the forward flange 57 of the cross member 56 is the front support 60. This support is U-shaped in outline and shallow channel-shaped in section. Fixed in the center of the support 60 is the curved bracket 68 which extends forward and upward in position to function as a fixed abutment against which an inflated tire 72 carried by the spare rim 74 is held. A vertically disposed bracket 65 is fixed to the center of support 60 on top of bracket 68 and is positioned to contact the inner side of rim 74.

Rigidly fixed to the upper side of the rear end of each of the frame members 50 is a bracket 62 which extends rearward. A rear support 66 extends across the frame beneath the rear end of the rim and tire and is supported on brackts 62 by bolts 64 carrying wing nuts 63. In the illustrated form, support 66 is a straight channel bar. In the center of the bar 66 is fixed a bracket 67 which abuts against the inner side of rim 74 in a position diametrically opposite to bracket 65. With the structure described, tightening of wing nuts 63 clamps the rim and tire, or rim alone if no tire is carried, between the two supports 60 and 66 and a fixed abutment, which comprises the flange 59 of member 56. The rim and tire are held against movement in a horizontal plane by the brackets 65, 67 and 68 and by the fact that the upper side of the tire is held tightly against the flange 59. If desired, a T-shaped support 70 may be provided on the rear end of the left hand bracket 62 for supporting the license tag and tail light. The operation of the carrier is the same as the operation of the first embodiment described.

We claim:

1. In a chassis including side frame members, a carrier supported thereon comprising longitudinally spaced supports, one of which is vertically adjustable, and the other of which is fixed, and a rigid abutment between said supports and spaced from the plane thereof for holding a tire fixed between the abutment and said supports.

2. In a chassis including side frame members, a carrier supported thereon comprising a cross member for engagement with the upper side of a tire, a rigid support ahead of and below said cross member, and a vertically adjustable support in rear of and below said cross member and adapted by its adjustment to removably clamp a tire between the supports and cross member.

3. In a chassis including side frame members, a rim carrier supported thereon comprising longitudinally spaced supports, one of which is vertically adjustable, and the other of which is stationary, a rigid abutment between said supports and spaced from the plane thereof for holding a tire therebetween, and means on said supports for holding said tire against horizontal displacement.

4. In a vehicle including side frame members, a rim carrier supported thereon comprising front and rear transversely extending supporting bars, one of which is vertically adjustable and the other of which is stationary, and means on said frame for holding said rim against vertical movement.

5. In a vehicle including side frame members, a rim carrier supported thereon comprising a transversely extending U-shaped support suspended beneath and rigidly connected at opposite ends to the frame members, a second support adjustably connected at opposite ends to the frame members for vertical movement, means on the frame for holding said rim against vertical movement, and means on said U-shaped support for resisting horizontal displacement of said rim.

6. In an underslung tire carrier for motor vehicles and the like, a fixed tire engaging member, a vertically adjustable tire engaging member spaced from the first mentioned member in substantially the plane thereof, and a fixed tire engaging member positioned intermediate the other members and spaced from the plane thereof.

7. Means to suspend a tire in a substantially horizontal position beneath a chassis frame of a motor vehicle, including a supporting strap extending transversely beneath said frame and rigidly connected at opposite ends to the side members of the frame, for engagement with the underside of a tire, another supporting strap also extending transversely beneath the frame but in longitudinally spaced relation to the first strap and adjustably connected at opposite ends with the frame members for relative vertical movement and also engageable with the underside of the tire and an abutment member for the upper side of the tire against which the tire is moved into clamped contact by the adjustment of the last mentioned strap.

In testimony whereof we affix our signatures.

ORMOND E. HUNT.
ALBERT G. GEISTERT.